United States Patent
Jamil et al.

(10) Patent No.: US 8,943,273 B1
(45) Date of Patent: Jan. 27, 2015

(54) METHOD AND APPARATUS FOR IMPROVING CACHE EFFICIENCY

(75) Inventors: Sujat Jamil, Gilbert, AZ (US); R. Frank O'Bleness, Tempe, AZ (US); Russell Robideau, Chandler, AZ (US); Tom Hameenanttila, Phoenix, AZ (US); Joseph Delgross, Chandler, AZ (US); David Miner, Chandler, AZ (US)

(73) Assignee: Marvell International Ltd., Hamilton (BM)

(*) Notice: Subject to any disclaimer, the term of this patent is extended or adjusted under 35 U.S.C. 154(b) by 853 days.

(21) Appl. No.: 12/541,277

(22) Filed: Aug. 14, 2009

Related U.S. Application Data

(60) Provisional application No. 61/088,880, filed on Aug. 14, 2008, provisional application No. 61/088,873, filed on Aug. 14, 2008.

(51) Int. Cl.
*G06F 9/38* (2006.01)

(52) U.S. Cl.
CPC ............ *G06F 9/3826* (2013.01); *G06F 9/3842* (2013.01); *G06F 9/3859* (2013.01)
USPC .......................................... 711/126; 712/218

(58) Field of Classification Search
None
See application file for complete search history.

(56) References Cited

U.S. PATENT DOCUMENTS

| | | | | |
|---|---|---|---|---|
| 5,584,009 A * | 12/1996 | Garibay et al. | ............... | 711/117 |
| 5,664,137 A * | 9/1997 | Abramson et al. | ............ | 712/216 |
| 5,717,896 A * | 2/1998 | Yung et al. | .................... | 712/205 |
| 5,828,860 A * | 10/1998 | Miyaoku et al. | ............... | 712/207 |
| 5,838,943 A * | 11/1998 | Ramagopal et al. | .......... | 712/218 |
| 5,860,151 A * | 1/1999 | Austin et al. | ................... | 711/213 |
| 6,065,103 A * | 5/2000 | Tran et al. | ...................... | 711/156 |
| 6,321,297 B1 * | 11/2001 | Shamanna et al. | ............ | 711/122 |
| 6,671,781 B1 * | 12/2003 | Worrell | ......................... | 711/138 |
| 7,739,483 B2 * | 6/2010 | Patel et al. | ..................... | 712/214 |
| 2002/0103971 A1 * | 8/2002 | Saito et al. | ..................... | 711/118 |
| 2008/0010440 A1 * | 1/2008 | Altman et al. | ................ | 712/225 |
| 2008/0209129 A1 * | 8/2008 | Van De Waerdt et al. | ..... | 711/131 |
| 2009/0019272 A1 * | 1/2009 | Cypher et al. | ................ | 712/234 |
| 2009/0282225 A1 * | 11/2009 | Caprioli et al. | ............... | 712/225 |
| 2009/0300338 A1 * | 12/2009 | Caprioli et al. | ............... | 712/228 |

OTHER PUBLICATIONS

Ravi Bhargava and Lizy K. John. "Issues in the Design of Store Buffers in Dynamically Scheduled Processors." Apr. 2000. IEEE. ISPASS 2000.*
Norman P. Jouppi. "Cache Write Policies and Performance." May 1993. ACM. ISCA '93.*

(Continued)

*Primary Examiner* — Nathan Sadler

(57) ABSTRACT

Aspects of the disclosure provide methods for cache efficiency. A method for cache efficiency can include storing data in a buffer entry in association with a cache array in response to a first store instruction that hits the cache array before the first store instruction is committed. Further, when a dependent load instruction is subsequent to the first store instruction, the method can include providing the data from the buffer entry in response to the first dependent load instruction. When a second store instruction overlaps an address of the first store instruction, the method can include coalescing data of the second store instruction in the buffer entry before the second store instruction is committed. When the second store instruction is followed by a second dependent load instruction, the method can include providing the coalesced data from the buffer entry in response to the second dependent load instruction.

20 Claims, 14 Drawing Sheets

(56) References Cited

OTHER PUBLICATIONS

Alan Jay Smith. "Cache Memories." Sep. 1982. ACM. Computing Surveys. vol. 14. pp. 473-530.*
Yuan Chou et al. "Store Memory-Level Parallelism Optimizations for Commercial Applications." Nov. 2005. ACM. MICRO 38.*
Doug Hunt. "Advanced Performance Features of the 64-bit PA-8000." Mar. 1995. IEEE. Compcon'95.*
Pete Cockerell. "ARM Assembly Language Programming—Chapter 3—The Instruction Set." Archived Aug. 7, 2007. http://web.archive.org/web/20070807211329/http://www.peter-cockerell.net/aalp/html/ch-3.html.*
David A. Patterson and John L. Hennessy. "Computer Organization and Design." 1998. Morgan Kaufmann. $2^{nd}$ ed. p. 445.*
Tingting Sha et al. "Scalable Store-Load Forwarding via Store Queue Index Prediction." 2005. IEEE. MICRO'05.*
John Paul Shen and Mikko H. Lipasti. Modern Processor Design. 2005. McGraw-Hill. $1^{st}$ ed. pp. 267-273.*
Keith Diefendorff. "K7 Challenges Intel." Oct. 1998. Microprocessor Report. vol. 12. No. 14. pp. 1-7.*
Wenisch et al. "Mechanisms for Store-wait-free Multiprocessors." Jun. 2007. ACM. ISCA'07.*
Blundell et al. "Improved Sequence-based Speculation Techniques for Implementing Memory Consistency." May 2008. University of Pennsylvania. TR-CIS-08-18.*

* cited by examiner

200A

| PIPELINE STAGES / CLOCK CYCLE | ... | CACHE ACCESS | |
|---|---|---|---|
| (1) | STORE A,D | | |
| (2) | LOAD B | STORE A, D | |
| (3) | LOAD A | LOAD B | STORE A,D |
| (4) | | LOAD A | LOAD B |
| (5) | | | LOAD A |

| PIPELINE STAGES / CLOCK CYCLE | ... | CACHE ACCESS | |
|---|---|---|---|
| (1) | STORE A,D | | |
| (2) | LOAD A | STORE A, D | |
| (3) | | LOAD A | STORE A,D |
| (4) | | | LOAD A |
| (5) | | | |

| VALID (1) | PAINDEX (9) | TAG VLD (2) | INSTRTAG0 (10) | INSTRTAG1 (10) | TAG0LASTALLOC (1) | GRANT0 (1) | GRANT1 (1) | ABORT (1) | MULTISTORE (1) | DATA (64) |
|---|---|---|---|---|---|---|---|---|---|---|
| 605 | 610 | 615 | 620 | 625 | 630 | 640 | 645 | 650 | 655 | 660 |

METHOD AND APPARATUS FOR IMPROVING CACHE EFFICIENCY

INCORPORATION BY REFERENCE

This application claims the benefit of U.S. Provisional Applications No. 61/088,880, "Method and Apparatus to Achieve Speculative Store Forwarding" filed on Aug. 14, 2008, and No. 61/088,873, "Use of Multiple Valid Bits to Improve Efficiency of a Read-Only Cache" filed on Aug. 14, 2008, which are incorporated herein by reference in their entirety.

BACKGROUND

Computer systems can use caches to improve data access efficiency. In an example, a computer system can include a cache unit and a main memory unit that can be accessed by a processor. The processor can access the cache unit with a faster speed than accessing the main memory unit. Thus, the computer system can be configured to copy data stored in the main memory unit into the cache unit for the processor to access in order to improve the data access efficiency.

SUMMARY

Aspects of the disclosure can provide methods for improving cache efficiency. A method for improving cache efficiency can include storing data in a buffer entry in association with a cache array in response to a first store instruction that hits the cache array before the first store instruction is committed. Further, when a dependent load instruction is subsequent to the first store instruction, the method can include providing the data from the buffer entry in response to the first dependent load instruction.

The method can also include marking the buffer entry according to a commitment status of the first store instruction. According to the marking, the method can include at least one of evicting the buffer entry to store the data in the cache array and clearing the buffer entry based on the marking.

According to an embodiment of the disclosure, when a second store instruction overlaps an address of the first store instruction, the method can include coalescing data of the second store instruction in the buffer entry before the second store instruction is committed. When the second store instruction is followed by a second dependent load instruction, the method can include providing the coalesced data from the buffer entry in response to the second dependent load instruction.

The method can also include marking the buffer entry according to a commitment status of at least one of the first store instruction and the second store instruction. According to the marking, the method can include at least one of evicting the buffer entry to store the data in the cache array based on the marking, and clearing the buffer entry based on the marking.

In addition, the method can include writing to a backing memory in response to the first store instruction when the first store instruction is committed, and loading from the backing memory in response to the second dependent load instruction when the second store instruction is resolved as non-committed.

Aspects of the disclosure can provide a cache memory. The cache memory can include at least a cache array, a buffer unit having at least a buffer entry in association with the cache array, and a control unit. The control unit can be configured to store data in the buffer entry in response to a first store instruction before the first store instruction is committed, and provide the data from the buffer entry in response to a first dependent load instruction when the first dependent load instruction is subsequent to the first store instruction.

Further, the control unit can be configured to coalesce data of a second store instruction that overlaps an address of the first store instruction in the buffer entry before the second store instruction are committed, and provide the coalesced data from the buffer entry in response to a second dependent load instruction.

According to an aspect of the disclosure, the buffer entry can include at least a field for storing a commitment status of at least one of the first store instruction and the second store instruction. Further, the control unit can be configured to evict the buffer entry to store the data in the cache array based on the commitment status, and clear the buffer entry based on the commitment status.

In an embodiment, the cache array can include at least a multiple-valid-bit cache line that includes multiple portions having respective valid bits. Further, the buffer unit can include multiple entries that are respectively in association with the multiple portions. In an example, the cache array can be configured as a read-only cache array.

Aspects of the disclosure can also provide a computer system. The computer system can include a processor core, and a cache system. The processor core can be configured to access the cache system in response to memory access instructions. The cache system can include a backing memory and a cache unit. The backing memory can be configured to store data in response to store instructions that are committed. The cache unit can include at least a cache array, a buffer unit having at least a buffer entry in association with the cache array, and a control unit. The control unit can be configured to store data in the buffer entry in response to a first store instruction before the first store instruction is committed, and provide the data from the buffer entry in response to a first dependent load instruction when the first dependent load instruction is subsequent to the first store instructions.

BRIEF DESCRIPTION OF THE DRAWINGS

Various exemplary embodiments of this disclosure will be described in detail with reference to the following figures, wherein like numerals reference like elements, and wherein:

FIG. 6 shows an exemplary SFB entry according to an embodiment of the disclosure;

DETAILED DESCRIPTION OF EMBODIMENTS

Figure 1:
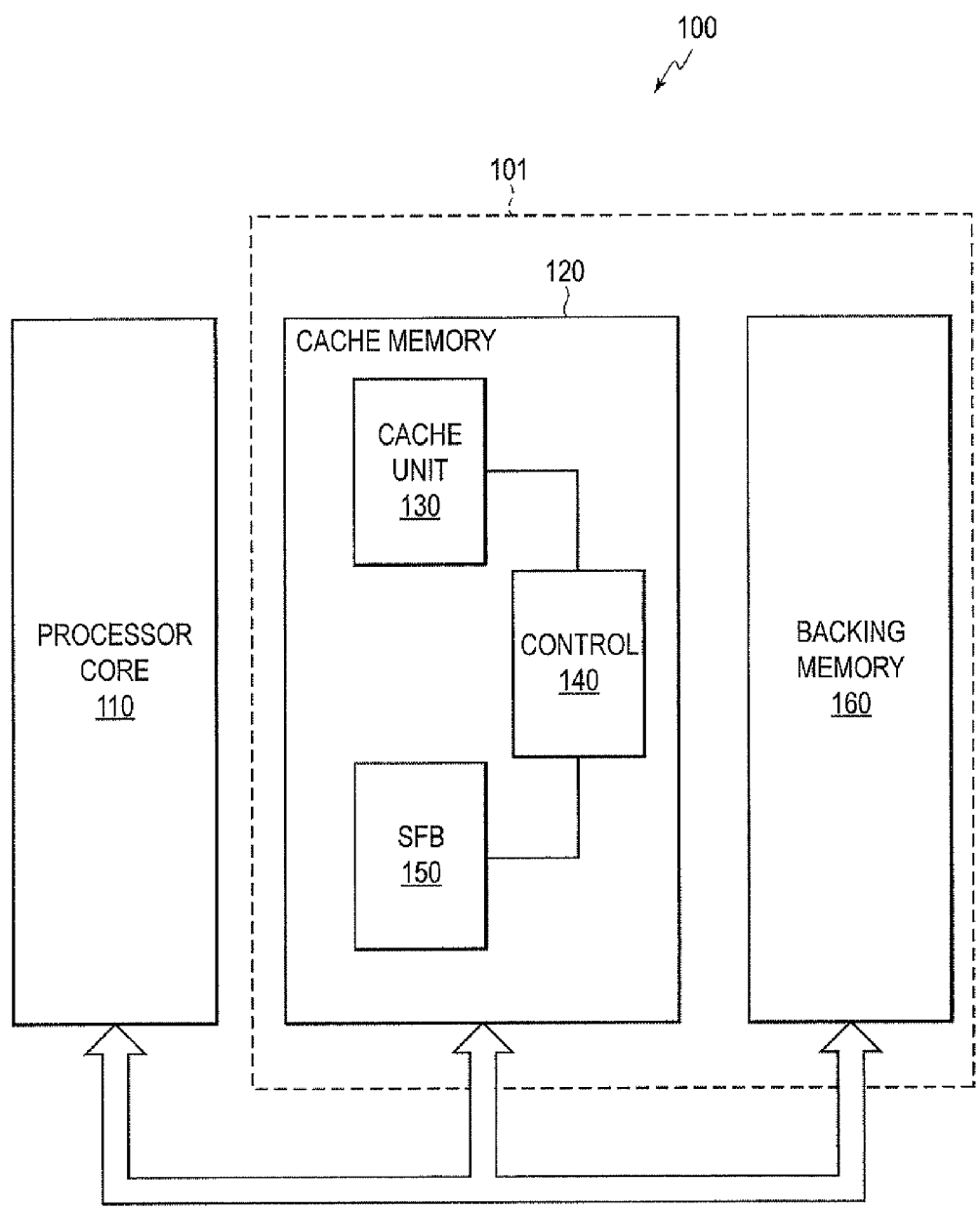
FIG. 1 shows a block diagram of an exemplary computer system according to an embodiment of the disclosure.

FIG. 1 shows a block diagram of an exemplary computer system 100 according to an embodiment of the disclosure. The computer system 100 includes a processor core 110 and a cache system 101 coupled together as shown in FIG. 1. The processor core 110 can include various execution units to perform various data operations according to instructions. The cache system 101 can be a data cache system for data storage. It is noted that the computer system 100 can include other memory systems (not shown) for instruction storage.

The processor core 110 can access the cache system 101 according to memory access instructions, such as store instructions, load instructions, and the like. For example, the processor core 110 can write data to the cache system 101 according to the store instructions, and can read data from the cache system 101 according to the load instructions.

The cache system 101 includes a speculative forward buffer (SFB) enabled cache memory 120, and a backing memory 160. The SFB enabled cache memory 120 and the backing memory 160 can be configured and coupled together according to a memory hierarchy design.

More specifically, the SFB enabled cache memory 120 can have a faster access speed but a smaller size, and the backing memory 160 can have a slower access speed but a larger size. Due to the smaller size, the SFB enabled cache memory 120 may or may not have a storage location corresponding to an address in a memory access instruction. When the SFB enabled cache memory 120 has a storage location corresponding to the address in the memory access instruction, the SFB enabled cache memory 120 can have a cache hit, and enable the memory access instruction to be executed with the faster access speed. On the other hand, when the SFB enabled cache memory 120 does not have a storage location corresponding to the address in the memory access instruction, the SFB enabled cache memory 120 can have a cache miss. When the SFB enabled cache memory 120 has a cache miss, the execution of the memory access instruction can be supported by the backing memory 160. In addition, the SFB enabled cache memory 120 can operate speculatively before a memory access instruction is committed, which further improves the access speed.

The backing memory 160 can be configured to ensure a storage location corresponding to the address in the memory access instruction. Thus, the backing memory 160 can ensure storing data in response to a store instruction, and can ensure providing data in response to a load instruction. Further, the backing memory 160 can be configured to store data in response to store instructions that have been committed. Thus, the data in the backing memory 160 is certain, and does not depend on any speculations. It is noted that the backing memory 160 can include any suitable memory unit, or combinations of suitable memory units.

The SFB enabled cache memory 120 further includes a cache unit 130, an SFB unit 150, and a control logic unit 140. The cache unit 130 can be any suitable cache unit. In an example, the cache unit 130 is a read-only cache unit. In another example, the cache unit 130 is a multiple-valid-bit cache unit. In another example, the cache unit 130 is a multiple-valid-bit read-only cache unit.

The SFB unit 150 can include at least an SFB entry configured to buffer data in response to a store instruction that hits the cache unit 130. In an embodiment, the data in the store instruction is combined with a portion of the data in the cache unit 130. Then, the combined data is buffered in the SFB entry. The store instruction can be committed or not committed. In addition, the SFB entry can store various information of the store instruction, such as a commitment status to indicate whether the store instruction has been committed. In an example, the SFB entry stores a grant status and an instruction tag based on a reorder buffer (ROB) unit.

Generally, when an instruction is executed, but not committed, the result of the execution, such as register files, and the like, can be buffered in a reorder buffer (ROB) unit. The ROB unit can use an instruction tag for identifying the non-committed instruction. When the instruction is committed, the ROB grants the instruction, and the buffered result can be suitably used to update, for example, registers.

Further, the SFB unit 150 can be configured to operate according to the various information. For example, before the store instruction is committed, the SFB unit 150 can speculatively provide data to a dependent load instruction that reads the address in the store instruction. In another example, before the store instruction is committed, the SFB unit 150 speculatively coalesces data in the SFB entry in response to another store instruction that has overlapping address with the previous store instruction.

The control logic unit 140 can include suitable control circuits to couple the cache unit 130 and the SFB unit 150, and control the operations of the cache unit 130 and the SFB unit 150. Further, the control logic unit 140 can enable the SFB enabled cache memory 120 to reduce cache access time for store instructions. Thus, the store instructions can have substantially matching cache access time as load instructions. Therefore, the store instructions and load instructions can flow in a cache pipeline without needing to stall. In addition, the control logic unit 140 can enable the SFB enabled cache memory 120 to speculatively operate in response to store instructions and/or load instructions without needing to wait for the store instructions and/or the load instructions to be committed. Further, the control logic unit 140 can enable the SFB enabled cache memory 120 to suitably handle various special scenarios, such as mis-prediction, and the like.

According to an aspect of the disclosure, a majority of memory accesses in an instruction stream can be certain or can be correctly predicted. The instruction stream may or may not include a small portion of mis-predictions. The SFB enabled cache memory 120 can improve cache access efficiencies for the majority of memory accesses, and can correctly handle the mis-predictions. Thus, the SFB enabled cache memory 120 can reduce an average memory access time of the memory access instructions.

Generally, a load instruction can speculatively read the data before a cache hit condition is determined. However, a store instruction has to perform data write to a cache unit after a cache hit condition is determined. Thus, the store instruction can require longer cache access time, for example, an additional clock cycle, at a cache access stage of a cache pipeline, which can stall an instruction flow in the cache pipeline.

According to an embodiment of the disclosure, the SFB enabled cache memory 120 enables a substantially matching cache access time for store instructions and load instructions. Specifically, the SFB enabled cache memory 120 can buffer suitable information in the SFB unit 150 in response to a store instruction having a cache hit to the cache unit 130. The suitable information can include data, address, commitment status of the store instruction, and the like. The buffered data can be evicted and officially stored in the cache unit 130 at a later time. It is noted that the eviction can be performed at the same time with another non-conflicting memory access instruction that accesses a different address, thus does not require additional time. Meanwhile, the SFB unit 150 can store the data and the address. Further, the control logic unit 140 can enable suitable operations of the SFB unit 150 in response to following memory access instructions in various situations.

In an example, the store instruction is committed. The control logic unit 140 enables the SFB unit 150 to forward the buffered data to a dependent load instruction that reads the address of the store instruction. Further, the control logic unit 140 enables the SFB unit 150 to evict the data to the cache unit 130 for storage when there is an opportunity, such as an opening in the cache pipeline, or the same time when a non-conflicting instruction accesses the SFB enabled cache memory 120. In an embodiment, the control logic unit 140 enables the SFB unit 150 to evict the buffered data in an SFB entry in a first available clock cycle.

In another example, the store instruction has not been committed. Whether or not the store instruction and the dependent load instruction commit can depend on the branch prediction associated with a prior conditional branch instruction. The control logic unit 140 enables the SFB unit 150 to speculatively bypass the buffered data to the dependent load instruction. Later, when the branch prediction is confirmed, the bypass is activated, and the buffered data is evicted to the cache unit 130 for storage when there is an opportunity, such as an opening in the cache pipeline, or at the same time when a non-conflicting instruction accesses the SFB enabled cache memory 120. When the branch prediction is wrong, the dependent load instruction can be flushed out with the store instruction.

In another example, the store instruction itself is conditional and has not been granted. In an embodiment, the control logic unit 140 enables the SFB unit 150 to speculatively bypass the buffered data in response to a following dependent load instruction. Later, when the store instruction is committed, the bypass is activated, and the buffered data is evicted to the cache unit 130 for storage when there is an opportunity. When the store instruction is aborted, the control logic unit 140 enables the SFB unit 150 and the cache unit 130 to invalidate corresponding entries to the aborted store instruction. Further, the backing memory 160 can provide data in response to the dependent load instruction.

In another embodiment, when the store instruction itself is conditional and has not been granted, the control logic unit 140 can be configured not to bypass the speculatively buffered data in response to a following dependent load instruction.

In another example, the store instruction is not granted, and is followed by a second store instruction to the same or overlapping address. The control logic unit 140 enables the SFB unit 150 to speculatively coalesce data of the second store instruction into the same SFB entry allocated to the previous store instruction. The SFB entry also stores a status to indicate the coalescence. For example, the SFB entry can store instruction tags for both store instructions, and commitment statuses for both store instructions. Further, the coalesced data can be speculatively bypassed to a dependent load instruction. When the coalescence is confirmed, the bypass is activated, and the coalesced data is evicted to the cache unit 130 for storage when there is an opportunity. However, when the coalescence is incorrect, the control logic unit 140 is configured to invalidate corresponding entries in the SFB unit 150 and the cache unit 130. Further, the backing memory 160 can provide data in response to the dependent load instruction.

Figure 2A:
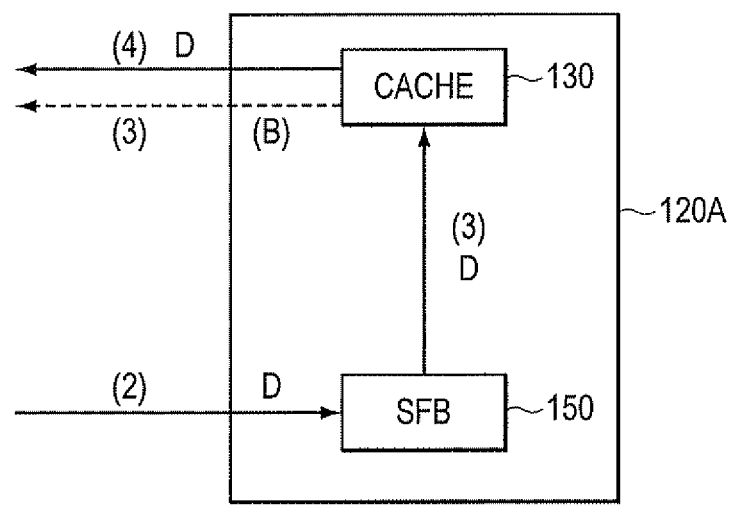
FIG. 2A-C show operations of an exemplary speculative forward buffer (SFB) enabled cache unit under various scenarios according to an embodiment of disclosure.
Figure 2B:
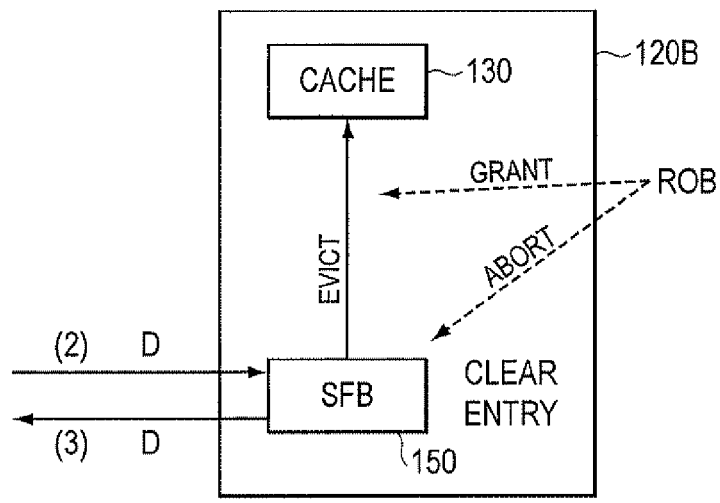
Figure 2C:
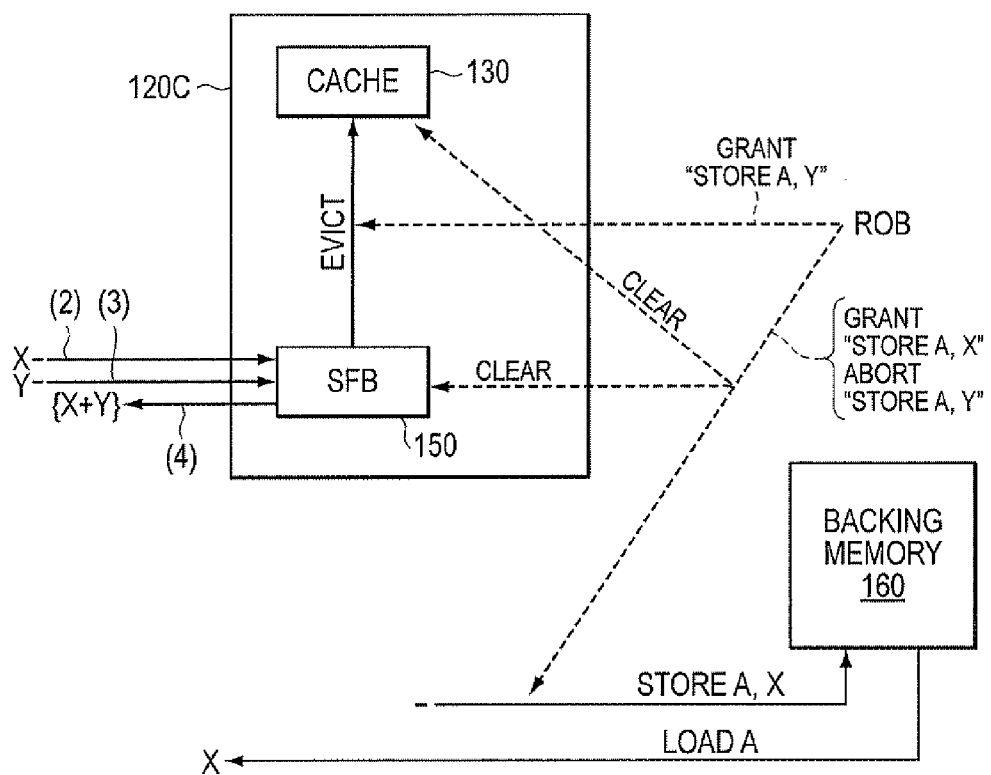

FIG. 2A-C show exemplary operations of an SFB enabled cache unit according to an embodiment of disclosure.

FIG. 2A shows a table 200A of an instruction flow in a cache pipeline for scenario A. The instruction flow includes a store instruction "store A, D" that stores data D to address A, and a dependent load instruction "load A" that loads data from address A. In addition, the store instruction and the dependent load instruction are spaced by a non-conflicting instruction, such as "load B" that loads data from address B that is different from address A. The instructions in scenario A can be architecturally committed, at the time when the instructions are in the cache access stage.

FIG. 2A also shows a block diagram 120A illustrating data paths within the SFB enabled cache memory 120 in response to the instruction flow in the cache pipeline. In response to the store instruction, the SFB enabled cache memory 120 can have a cache hit and buffer suitable information in an SFB entry in clock cycle (2). The suitable information may include data D, address A, a commitment status for the store instruction, an instruction tag of the store instruction, and the like.

In clock cycle (3), the SFB unit 150 evicts the data D from the SFB entry and officially stores the data in the cache unit 130. In addition, the SFB enabled cache memory 120 reads data stored at address B in response to the "load B" instruction. In clock cycle (4), the SFB enabled cache memory 120 provides the data D from the cache unit 130 in response to the dependent load instruction.

FIG. 2B can shows a table 200B of an instruction flow in a cache pipeline for scenario B. The instruction flow includes a store instruction "store A, D" that stores data D to address A, and a subsequent dependent load instruction "load A" that loads data from address A.

FIG. 2B also shows a block diagram 120B illustrating data paths within the SFB enabled cache memory 120 in response to the instruction flow in the cache pipeline. In response to the store instruction, the SFB enabled cache memory 120 can have a cache hit and buffer suitable information in an SFB entry in clock cycle (2). The suitable information can include data D, address A, an instruction tag for the store instruction, a commitment status for the store instruction, and the like. In clock cycle (3), the SFB enabled cache memory 120 speculatively bypasses the data D from the SFB unit 150 in response to the dependent load instruction.

The SFB enabled cache memory 120 can further operate depending on the commitment status of the store instruction. When the store instruction is committed (e.g., a grant bit being set based on the ROB unit), the SFB entry can evict the buffered data to the cache unit 130 for storage when there is an opportunity. When the store instruction is aborted, the SFB entry can be cleared, for example, by clearing a valid bit for the SFB entry.

In an embodiment, the dependent load instruction and the store instruction can depend on a branch prediction. When the store instruction is aborted, the dependent load instruction can be flushed out with the store instruction. In another embodiment, the store instruction itself is conditional. When the store instruction is aborted, the SFB entry and a corresponding cache entry in the cache unit 130 can be invalidated, and the backing memory 160 can provide data in response to the load instruction.

FIG. 2C shows a table 200C of an instruction flow in a cache pipeline for scenario C. The instruction flow includes a first store instruction "store A, X" that stores data X to address A, a second store instruction "store A, Y" that stores data Y to address A, and a dependent load instruction "load A" that loads data from address A. The first store instruction and the second store instruction are not committed at the time when the dependent load instruction is in the cache access stage.

FIG. 2C also shows a block diagram 120C illustrating operations of the SFB enabled cache memory 120 in response to the instruction flow in the cache pipeline. In response to the first store instruction, the SFB enabled cache memory 120 can have a cache hit and buffer suitable information in an SFB entry in clock cycle (2). The suitable information can include data X, address A, an instruction tag for the first store instruction, a commitment status for the first store instruction, and the like.

In clock cycle (3), the SFB unit 150 can have a cache hit and speculatively coalesce suitable information in the same SFB entry, in response to the second store instruction. The suitable information can include data X, an instruction tag for the second store instruction, a commitment status for the second store instruction. In an example, the SFB entry can store both the instruction tags for the first store instruction and the second store instruction, and both the commitment status for the first store instruction and the second store instruction. Further, the SFB entry can be marked as multiple-store, for example, by setting a multi-store bit.

In clock cycle (4), the SFB enabled cache memory 120 speculatively provides the coalesced data, a combination of X and Y in this case, represented by {X+Y}, from the SFB entry, in response to the dependent load instruction.

The SFB enabled cache memory 120 can perform further operations when the commitment statuses of the first store instruction and the second store instruction have been updated, for example, by the ROB unit. When the ROB unit grants the second store instruction, the SFB entry can evict the coalesced data to the cache unit 130 for storage when there is an opportunity. However, when the ROB unit aborts the second store instruction, and grants the first store instruction, the SFB enabled cache memory 120 can clear the SFB entry and a corresponding cache entry in the cache unit 130, for example, by respectively clearing valid bits for the SFB entry and the corresponding cache entry. In addition, the backing memory 160 can store data in response to the granted first store instruction, and provide the stored data in response to the dependent load instruction.

Figure 3:
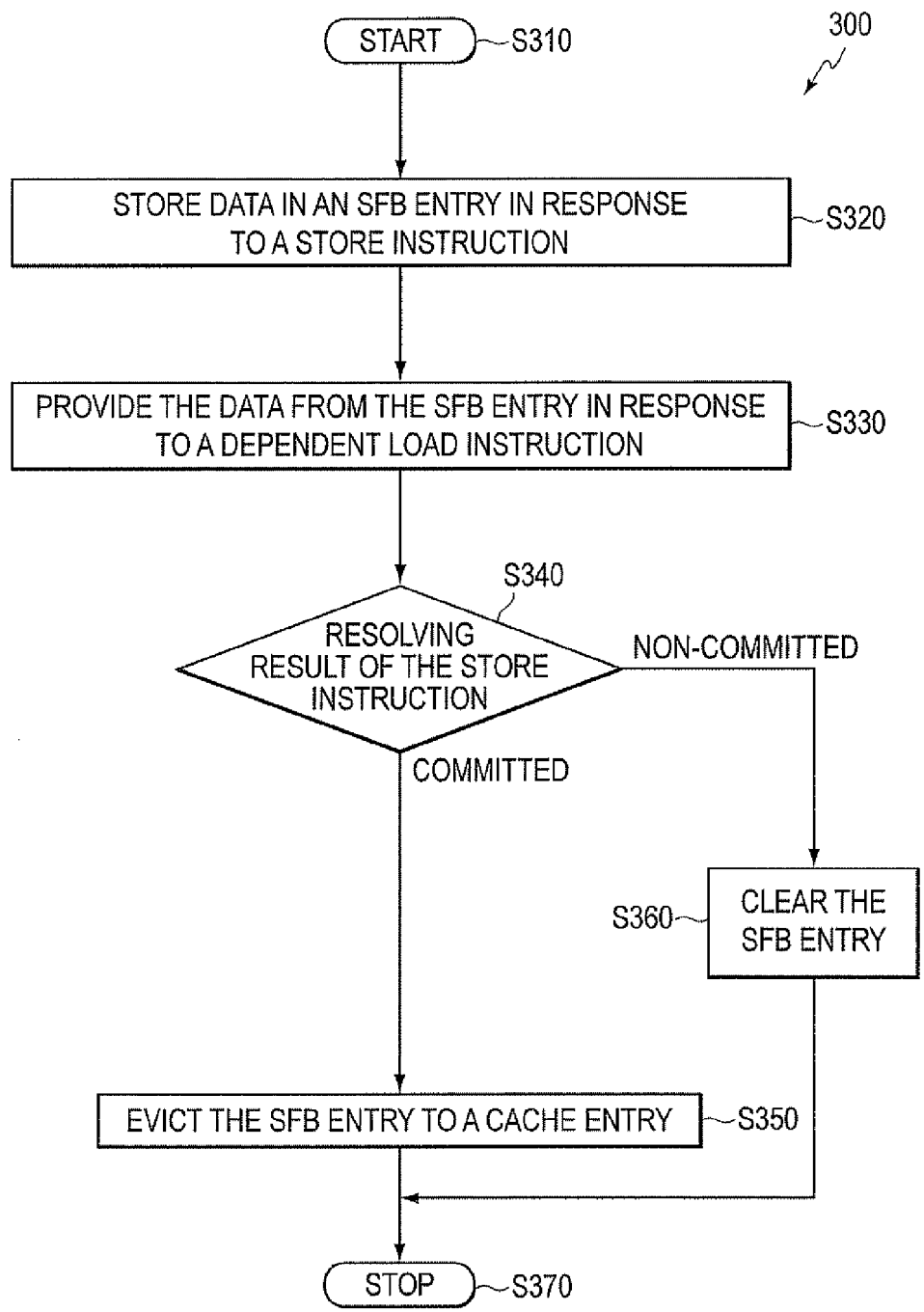
FIG. 3 shows a flow chart outlining an exemplary cache process according to an embodiment of the disclosure.

FIG. 3 shows a flow chart outlining an exemplary process 300 according to an embodiment of the disclosure. The process 300 illustrates operations of the SFB enabled cache memory 120 in response to a store instruction and a dependent load instruction. The process starts at step S310 and proceeds to step S320.

In step S320, the SFB enabled cache memory 120 stores data in an SFB entry within the SFB unit 150 in response to the store instruction. The store instruction can be committed or not committed. The SFB entry can store a commitment status of the store instruction, for example, using a specific bit. When the store instruction is not committed, the execution result of the store instruction (e.g., register files) can be buffered in the ROB unit. When the store instruction is resolved as committed, the ROB unit grants the store instruction, and the commitment status is updated. It is noted that the SFB entry can also store various suitable information of the store instruction, such as an instruction tag in the ROB unit, an address index, and the like. Then, the process proceeds to step S330.

In step S330, the SFB enabled cache memory 120 provides the data from the SFB entry in response to a dependent load instruction. In an embodiment, the store instruction is committed, however, the dependent load instruction is subsequent to the store instruction. Thus, the data is still in the SFB entry, and can be bypassed to the dependent load instruction. In another embodiment, the store instruction is not committed, and the data is speculatively bypassed from the SFB entry in response to the dependent load instruction. Then, the process proceeds to step S340.

In step S340, a commitment status of the store instruction is checked to determine further operations. When the store instruction is committed, the process proceeds to step S350, and when the store instruction is resolved as non-committed, the process proceeds to step S360.

In step S350, the SFB entry evicts the data to the cache unit 130 for storage when there is an opportunity. Then, the process proceeds to step S370 and terminates.

In step S360, the SFB entry is cleared, for example, by clearing a valid bit. Then, the process proceeds to step S370 and terminates.

It is noted that additional operations can be performed in other portion of a computer system to suitably handle various situation. In an example, the dependent load instruction and the store instruction are conditional based on a branch prediction. When the store instruction is resolved as non-committed, the dependent load instruction can also be flushed out of the cache pipeline. In another example, the store instruction itself is conditional. When the store instruction is resolved as non-committed, the dependent load instruction can be forced to the backing memory 160 to read the correct data.

It is also noted that the SFB enabled cache memory 120 can perform some steps in parallel or in a different order from FIG. 3. In an example, the SFB enabled cache memory 120 can perform the step S330 and the step S350 in a same clock cycle. In another example, when the store instruction is granted before the SFB enabled cache memory 120 providing data to the dependent load instruction, the SFB enabled cache memory 120 can perform the eviction step S350 first to evict the buffered data to a cache entry, and then can provide the data to the dependent load instruction from the cache entry.

Figure 4:
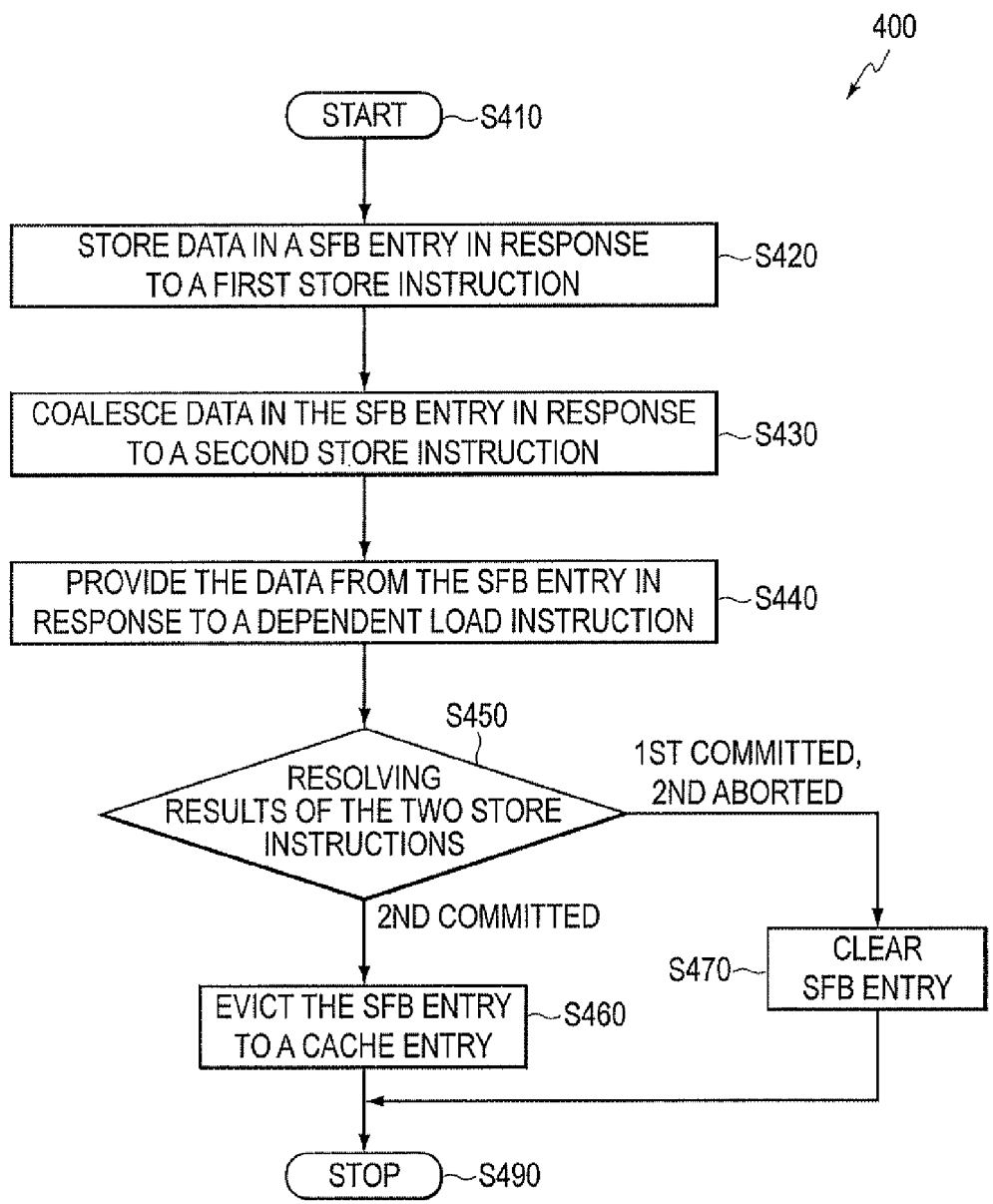
FIG. 4 shows a flow chart outlining another exemplary cache process according to an embodiment of the disclosure.

FIG. 4 shows a flow chart outlining another exemplary cache process 400 according to an embodiment of the disclosure. The process 400 illustrates operations of the SFB enabled cache memory 120 in response to a first store instruction, a second store instruction and a dependent load instruction. The first store instruction and the second store instruction can store data to overlapping addresses, such as a same address for a double-word. In addition, the first store instruction and the second store instruction are not committed at the time when the dependent load instruction accesses the SFB enabled cache memory 120. Later, the commitment statuses of the first store instruction and the second store instruction can be resolved. The process starts at step S410 and proceeds to step S420.

In step S420, the SFB enabled cache memory 120 stores data in an SFB entry within the SFB unit 150 in response to the first store instruction. In addition, the SFB entry can store a commitment status of the first store instruction. It is noted that the SFB entry can also store various suitable information of the first store instruction, such as instruction tag, and the like. Then, the process proceeds to step S430.

In step S430, the SFB enabled cache memory 120 coalesces data into the SFB entry in response to the second store instruction. In addition, the SFB entry can store a commitment status of the second store instruction, and a multiple-store status to indicate that a speculative store instruction coalesces with another store instruction. It is noted that the SFB entry can also store various suitable information of the second store instruction, such as an instruction tag, and the like. Then, the process proceeds to step S440.

In step S440, the SFB enabled cache memory 120 speculatively bypasses the coalesced data from the SFB entry in response to the dependent load instruction. Then, the process proceeds to step S450.

In step S450, the resolving results of the coalesced store instructions are checked to determine further operations. When the second store instruction is committed (implying that the first store instruction has been committed), the process proceeds to step S460; and when the first store instruction is committed, and the second store instruction is aborted, the process proceeds to step S470.

In step S460, the SFB enabled cache memory 120 evicts the SFB entry to a corresponding cache entry when there is an opportunity. In addition, the bypassed data to the dependent load instruction can be activated. It is also noted that the backing memory unit 160 can also store data in response to the committed second store instruction. Then, the process proceeds to step S490 and terminates.

In step S470, the SFB enabled cache memory 120 clears the SFB entry, for example, by clearing a valid bit of the SFB entry. In addition, the SFB enabled cache memory 120 can also clear a corresponding cache entry in the cache unit 130 by clearing a valid bit for the cache entry. It is also noted that the backing memory unit 160 can store data in response to the committed first store instruction. Further, the dependent load instruction can be forced to the backing memory 160 to read the stored data. In an embodiment, the SFB enabled cache memory 120 is configured to cause a line-fill that can copy the stored data in response to the first store instruction from the backing memory 160 into the corresponding cache entry. Then the process proceeds to step S490 and terminates.

It is noted that the SFB enabled cache memory 120 can perform some steps in parallel or in a different order from FIG. 4. In an example, the SFB enabled cache memory 120 can perform the step S440 and the step S460 in a same clock cycle.

Figure 5:
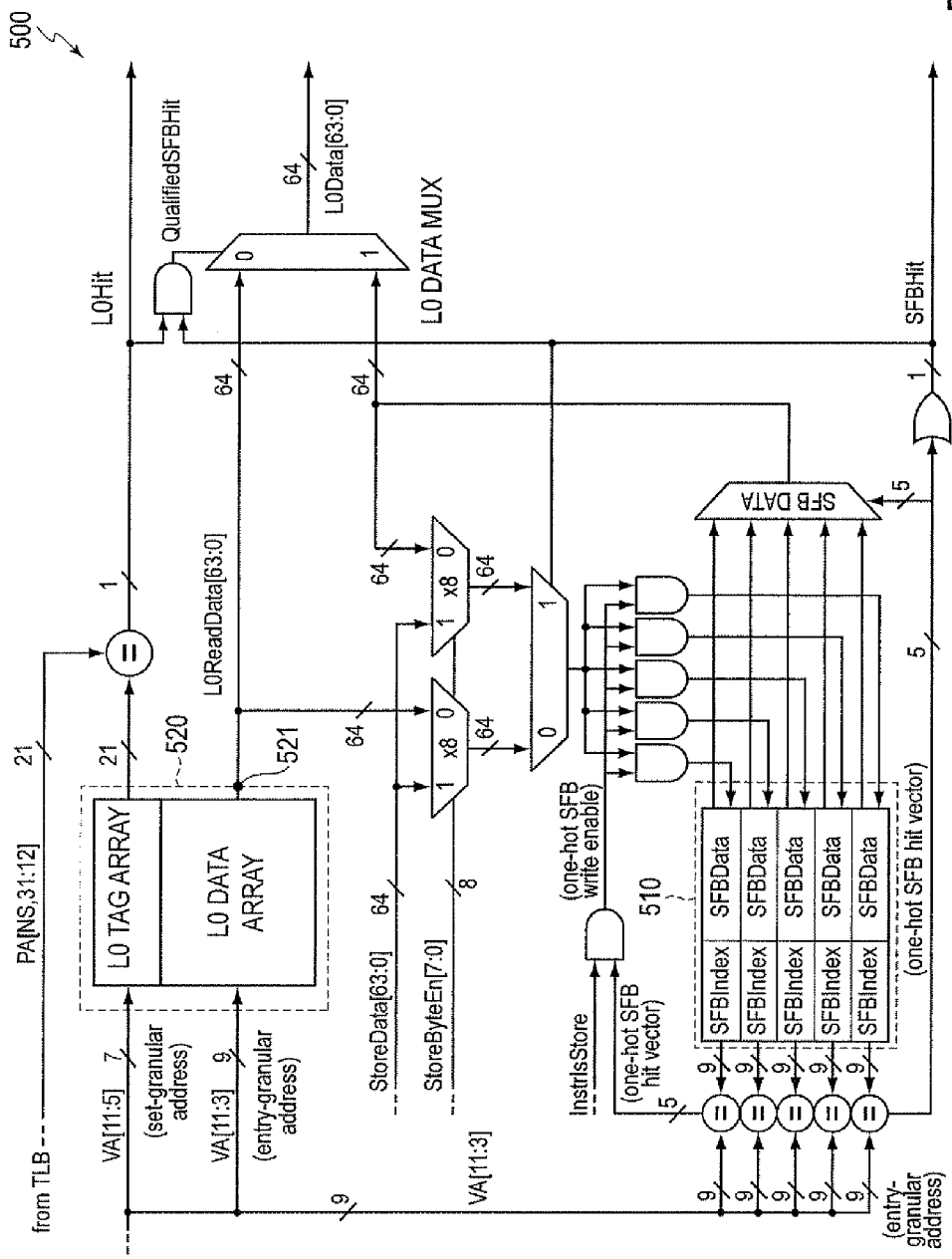
FIG. 5 shows a block diagram of an exemplary SFB enabled cache memory according to an embodiment of the disclosure.

FIG. 5 shows a block diagram of an exemplary SFB enabled cache memory 500 according to an embodiment of the disclosure. The SFB enabled cache memory 500 can be configured as a L0 cache memory, and can be coupled to a backing L1 cache memory (not shown) in a L0-L1 configuration.

The SFB enabled cache memory 500 includes a L0 cache unit 520, a SFB unit 510, and various control logics that couple the L0 cache unit 520 with the SFB unit 510.

The L0 cache unit 520 includes a L0 tag array and a L0 data array. Further, the L0 cache unit 520 can be configured in a multiple-valid-bits configuration that a cache set can include multiple valid bits. More specifically, the L0 tag array can include a plurality of tag entries. Each tag entry can store an address tag for a cache set (a cache line). The L0 data array can include a plurality of data entries. Each data entry can be a portion of a cache set. In FIG. 5 example, each cache set includes 4 data entries. Each data entry can be assigned an independent valid bit. Thus, each cache set can include 4 valid bits that are respectively assigned to 4 data entries.

In FIG. 5 example, the L0 cache unit 520 is configured in a direct-mapped organization. Thus, a matching entry to an address can be determined by entry index. Further, the L0 cache unit 520 is configured as a read-only cache unit. The L0 cache unit 520 includes a read port 521 and a write port (not shown). The read port 521 can be coupled to a data path directed to a processor core, and the write port can be suitably coupled to an eviction data path from the SFB unit 510 and a line-fill data path from the backing memory.

The SFB unit 510 can be suitably configured according to the configuration of the L0 cache unit 520. For example, the number of SFB entries can depend on the number of entries in a cache set of the L0 cache unit 520. Because operations to entries of the same cache set can be conflicting, the SFB unit 510 needs enough entries to track independent store instructions to the same cache set. In FIG. 5 example, the SFB unit 510 includes five SFB entries. Four of the five SFB entries can track independent store instructions to the same cache set of the L0 cache unit 520. The fifth SFB entry can be available to accept a new store on the same cycle as one of the four SFB entries is evicted.

Each SFB entry can include various fields, such as an SFB index field, an SFBData field, and the like. Further, each SFB entry can be coupled to a comparator unit to determine an SFB hit. The SFB hit can be determined by comparing a stored index in the SFB index field with an index portion of a memory access instruction. In an embodiment, the comparator unit is implemented by content-addressable memory (CAM).

During operation, when the memory access instruction is a load instruction, the SFB enabled cache memory 500 outputs hit signals, such as L0Hit and SFBHit, and data L0Data[63:0]. More specifically, the virtual address (VA) of the load instruction can be used to access the L0 cache unit 520 while the physical address (PA) is translated, for example, by a translation lookaside buffer (TLB) unit. The L0 tag array and the L0 data array can determine matching entries based on a portion of the virtual address. For example, VA[11:5] can be used to determine a matching tag entry, and VA[11:3] can be used to determine a matching data entry. From the matching tag entry, a physical address stored in the matching tag entry can be obtained. The physical address can be compared with the translated physical address by the TLB to determine L0Hit, which can indicate whether the L0 cache unit has a cache hit.

In addition, a portion of the virtual address can be used to determine SFBHit, which can indicate whether the SFB unit 510 has a SFB hit. In FIG. 5 example, VA[11:3] is compared with the stored indexes in the SFB entries to determine the SFBHit. When the SFB unit 510 has a SFB hit, in other word, a stored index in an SFB entry matches VA[11:3], the control logic enables L0Data[63:0] to be sourced from the SFB entry. When none of the SFB entries has SFB hit, and the L0 cache unit 520 has a cache hit, the L0Data[63:0] is sourced from the matching data entry in the L0 cache unit 520. When none of the SFB entries has SFB hit, and the L0 cache unit 520 does not have a cache hit, the load instruction can be forced to the backing memory.

When the memory access instruction is a store instruction, the virtual address can be used to determine L0Hit and SFB hit in the same manner described above.

When a SFB entry has a SFB hit, the data for storage StoreData[63:0] can be combined with data from a matching data entry L0ReadData[63:0], and can be stored to the SFB entry having the SFB hit. It is noted that the SFB entry can buffer data from a previous store instruction. Then, the data store in response to the current store instruction can coalesce with the data of the previous store instruction in the SFB entry.

When none of the SFB entry has a SFB hit, an available SFB entry (an SFB entry having a cleared valid bit) can be allocated to store the combination of StoreData[63:0] and L0ReadData[63:0].

It is noted that the SFB enabled cache memory 500 can include other control logics (not shown). For example, the SFB enabled cache memory 500 can include eviction control logics that can suitably evict a granted SFB entry to the L0 cache unit 520 in a clock cycle.

While the L0 cache unit 520 is configured as a read-only cache unit in FIG. 5, it is noted that the SFB enabled cache memory 500 can be suitably adjusted to use a read/write cache unit. In addition, the L0 cache unit 520 can be configured in other cache organizations, such as a fully associative organization, a set associative organization, and the like.

FIG. 6 shows an exemplary SFB entry according to an embodiment of the disclosure. The SFB entry includes a VALID field 605, a PAINDEX field 610, a TAGVLD field 615, an INSTRTAG0 field 620, an INSTRTAG1 field 625, a TAG0LASTALL0C field 630, a GRANT0 field 640, a GRANT1 field 645, an ABORT field 650, a MULTISTORE field 655, and a DATA field 660. Table 1 describes the functions of the fields.

TABLE 1

Store Forward Buffer Fields

| Field | # bits | Description |
|---|---|---|
| VALID | 1 | This field is set when SFB is allocated, and cleared when SFB is de-allocated. |
| PAINDEX | 9 | This field stores a portion of physical address corresponding to an index for a data entry, such as a double-word entry |
| TAGVLD | 2 | This field indicates which instruction tag (INSTRTAG0 and INSTRTAG1) is valid |
| INSTRTAG0 | 10 | This field stores decoded instruction tag associated with a store instruction in the associated SFB entry. |
| INSTRTAG1 | 10 | This field stores decoded instruction tag associated with a coalesced store instruction in the associated SFB entry |
| TAG0LASTALLOC | 1 | This field indicates whether the last coalesced store was associated with INSTRTAG0. This field allows to determine the relative age of the two instruction tags. |
| GRANT0 | 1 | This field indicates whether the INSTRTAG0 has received a grant from the ROB. |
| GRANT1 | 1 | This field indicates whether the INSTRTAG1 has received a grant from the ROB. |
| ABORT | 1 | This field indicates whether the ROB has abort any instruction tags INSTRTAG0 and INSTRTAG1 |
| MULTISTORE | 1 | This field indicates whether the SFB entry coalesces a speculative store into a VALID entry. |
| DATA | 64 | This field stores data of double-word length. |

Figure 7A:
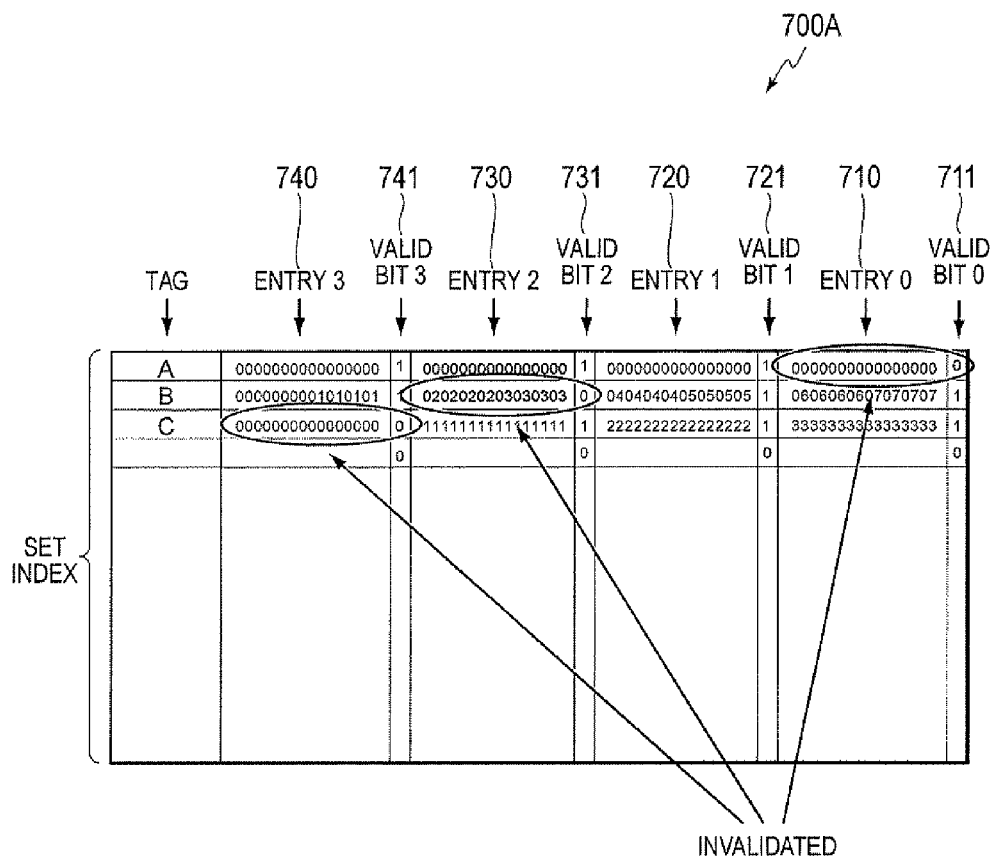
FIGS. 7A and 7B show a comparison of exemplary cache units according to an embodiment of the disclosure.
Figure 7B:
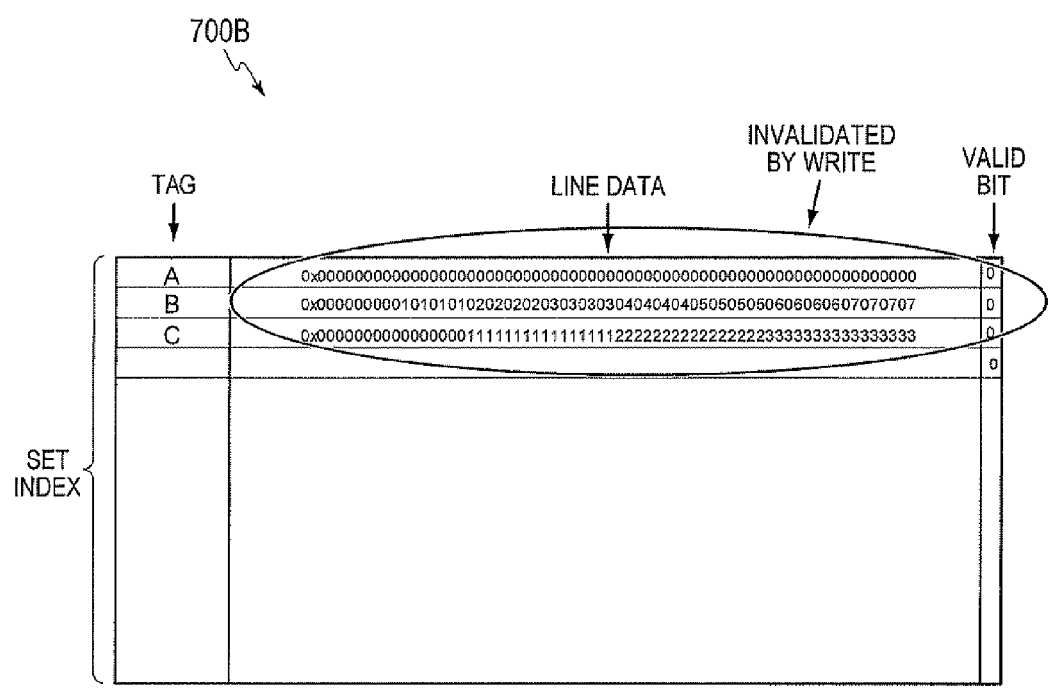

FIGS. 7A and 7B show a comparison of an exemplary multiple-valid-bit cache unit 700A and an exemplary single-valid-bit cache unit 700B. The L0 cache unit 520 in FIG. 5 can be configured according to the multiple-valid-bit cache unit 700A or the single-valid-bit cache unit 700B.

The multiple-valid-bit cache unit 700A includes a plurality of cache sets. The plurality of cache sets can be arranged according to set index. The set index can be used to locate a matching cache set. Each cache set includes a tag portion for storing a physical address corresponding to the cache set, and a data portion. The data portion can include multiple data entries for data storage. In the FIG. 7A example, a cache set includes four data entries, 710-740. Each entry can be assigned a valid bit. For example, valid bit 711 is assigned to entry 710, valid bit 721 is assigned to entry 720, valid bit 731 is assigned to entry 730, and valid bit 741 is assigned to entry 740. A valid bit indicates a valid status for the corresponding data entry. For example, when the valid bit is set ("1"), data in the corresponding entry field is valid; and when the valid bit is cleared ("0"), the data in the corresponding entry field is invalid.

The multiple-valid-bit cache unit 700A can have an increased cache efficiency than the single-valid-bit cache unit 700B that uses a single valid bit for a cache set. In the single-valid-bit cache unit 700B, when a valid bit is cleared, the whole set in association with the valid bit is invalid. Thus, a load instruction having a cache hit to the cache set can be forced to a backing memory, which is generally much slower than the cache units.

In the multiple-valid-bit cache unit 700A, when a valid bit is cleared, the associated data entry in the cache set is invalid. However, the rest of the cache set (3 entries) can still be valid. Thus, the rest of the cache set can still provide data in response to a load instruction.

It is noted that the multiple-valid-bit cache unit 700A and the single-valid-bit cache unit 700B can be suitably adjusted to use any cache organization, such as a fully associative organization, a direct mapped organization, a set associative organization, and the like.

According to another aspect of the disclosure, cache access efficiency for a read-only cache can be improved by proactively moving data from a backing memory into the read-only cache.

Figure 8:
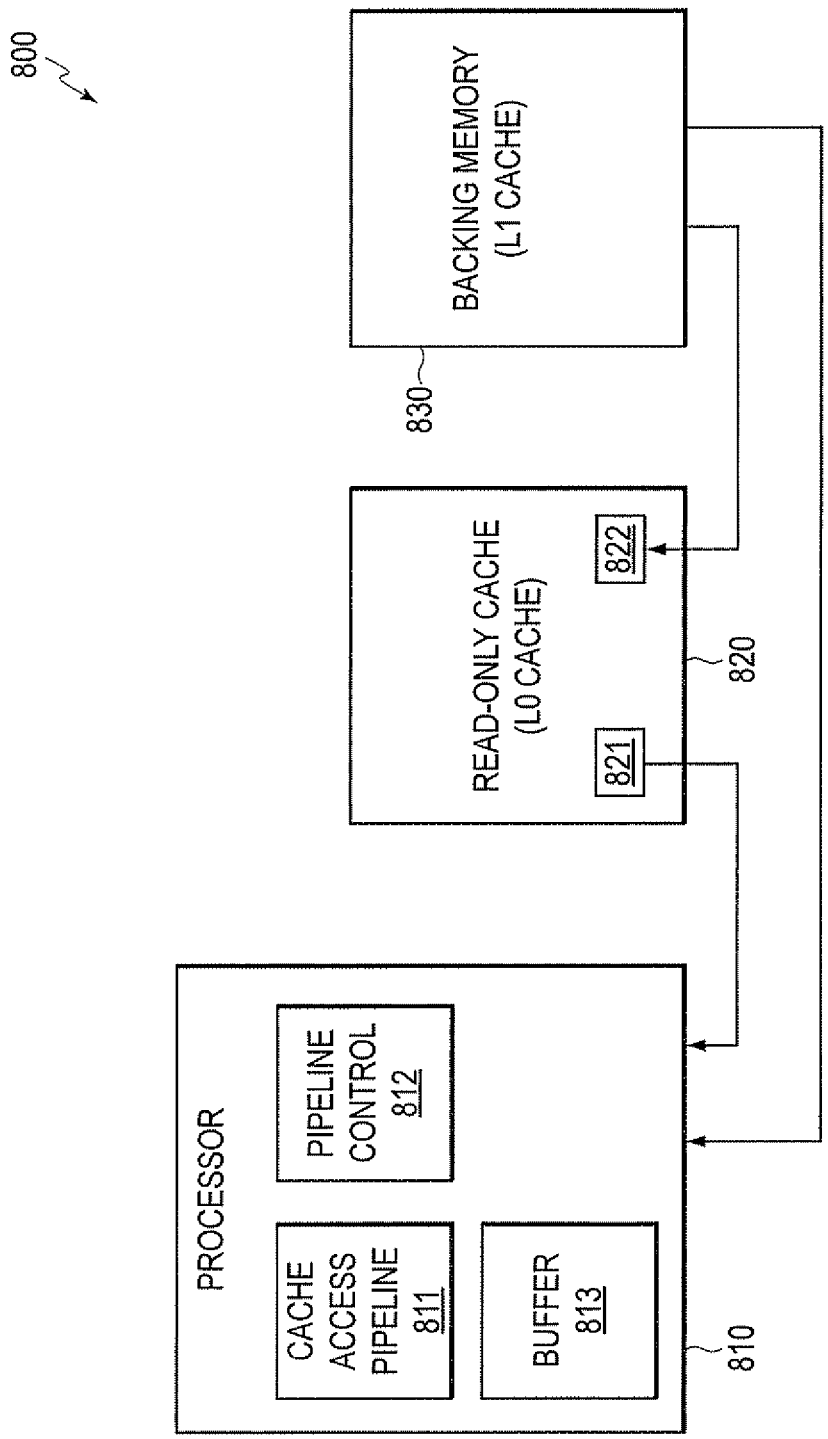
FIG. 8 shows a block diagram of an exemplary computer system according to an embodiment of the disclosure.

FIG. 8 shows a block diagram of an exemplary computer system 800 according to an embodiment of the disclosure. The computer system 800 can include a processor core 810, a read-only cache unit 820, and a backing memory 830. In addition, the computer system 800 can include various other components (not shown), such as network interface component, user interface component, and the like. These elements can be coupled together as shown in FIG. 8.

The read-only cache unit 820 can be configured to have a faster access speed in response to a load instruction when the read-only cache unit 820 has a cache hit. The read-only cache unit 820 includes a first port 821 coupled to the processor core 810 and a second port 822 coupled to the backing memory 830. The first port 821 can pull data from the read-only cache unit 820 to the processor core 810. The second port 822 can receive data from the backing memory unit 830 to fill one or more cache entries. Thus, the processor core 810 can directly read the read-only cache unit 820 and generally does not write directly to the read-only cache unit 820.

The backing memory 830 can be configured to ensure a storage location corresponding a memory access instruction. Thus, the backing memory 160 can ensure storing data in response to a store instruction, and can ensure providing data in response to a load instruction. Additionally, the backing memory 830 can provide data to the read-only cache unit 820. In an embodiment, when the read-only cache unit 820 has a cache miss in response to a load instruction, the computer system 800 can be configured to pull data, which can include the data corresponding to the load instruction, from the backing memory 830 into the read-only cache unit 820.

The read-only cache unit 820 can not directly store data in response to store instructions. Generally, the store instructions can proceed to the backing memory 830 for data storage. However, when the read-only cache unit 820 has a cache hit in response to a store instruction, the read-only cache unit 820 may include a stale copy of the data corresponding to the store address. The read-only cache unit 820 can invalidate a cache entry that includes the stale copy to avoid the processor core 810 loading the stale copy in response to a dependent load instruction.

According to an embodiment of the disclosure, the computer system 800 can be suitably configured to pull data from the backing memory 830 into the read-only cache unit 820 after executing a store instruction. The pulled data can update the stale copy corresponding to the store address. In an example, the computer system 800 can include suitable circuits to proactively generate an instruction to mimic a load instruction to load data from the store address. The instruction can have a cache miss because the corresponding cache entry has been invalidated, and result in pulling data from the backing memory 830 into the read-only cache unit 820.

In an embodiment, the processor core 810 can further include a cache access pipeline 811, a pipeline control unit 812, and a buffer unit 813.

The cache access pipeline 811 can overlap multiple instructions in execution. The cache access pipeline 811 can include multiple stages, such as an address generation stage, a cache access stage, a write back stage, and the like. The buffer unit 813 can include a buffer to buffer a store address in response to a store instruction.

The pipeline control unit 812 can control the operations of the cache access pipeline unit 811. For example, the pipeline control 812 can stall the cache access pipeline 811. In another example, the pipeline control unit 812 can suitably insert instructions in the cache access pipeline 811. According to an embodiment of the disclosure, the pipeline control unit 812 can stall the cache access pipeline unit 811 after a store instruction, generate an instruction and insert the instruction in the cache access pipeline 811 to cause a cache line-fill that copies data from the backing memory 830 into the read-only cache unit 820. In another example, the pipeline control unit 812 can detect an opening in the cache access pipeline 811 after a store instruction, generate an instruction and suitably insert the instruction in the opening to cause a cache line-fill that copies data from the backing memory 830 into the read-only cache unit 820.

More specifically, the pipeline control unit 812 can generate an instruction to mimic a load instruction at the cache access stage to load data at the store address of the store instruction. The instruction can be inserted at the cache access stage when the cache access stage has an opening. When the instruction is executed, both the read-only cache unit 820 and the backing memory unit 830 can be accessed. Because the read-only cache unit 820 has invalidated a corresponding cache entry in response to the store instruction, the read-only cache unit 820 can have a cache miss. Subsequently, the cache miss can start a cache that pulls the stored data from the backing memory unit 830 into the read-only cache unit 820.

Figure 9A:
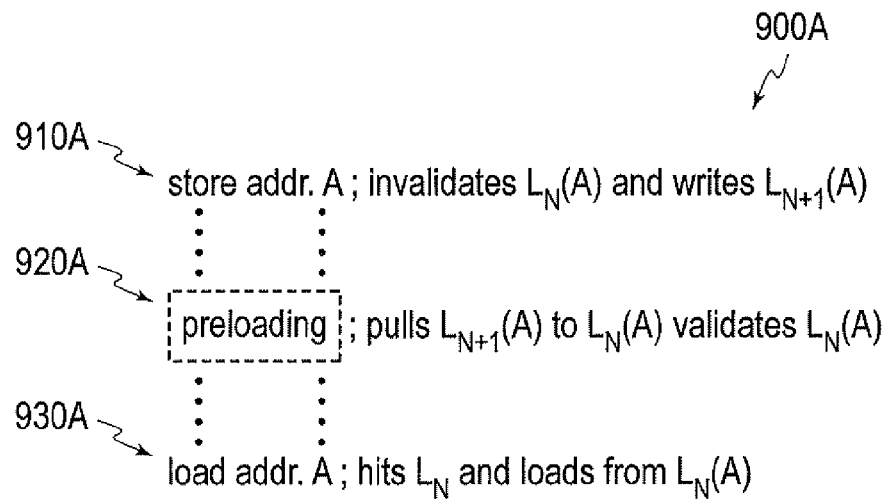
FIGS. 9A and 9B show a comparison of exemplary executions of a set of instructions according to an embodiment of the disclosure.
Figure 9B:
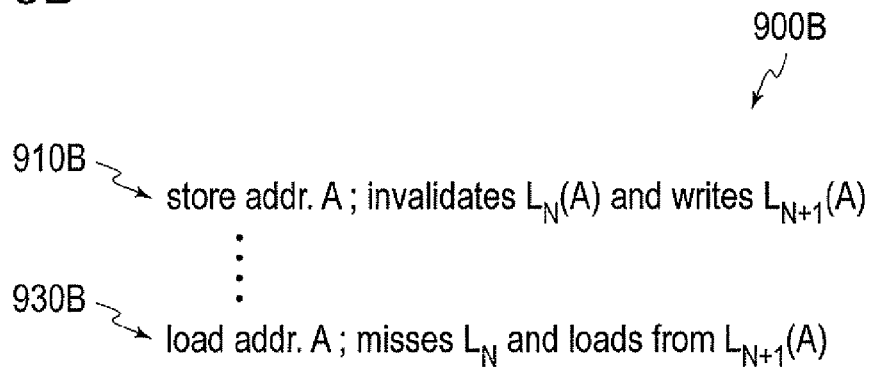

FIGS. 9A and 9B show exemplary instruction flows 900A and 900B of a set of instructions. The set of instructions can include a store instruction that stores data to a memory address A, and a dependent load instruction that loads the stored data at the memory address A. The instruction flow 900A can be performed by the computer system 800 in FIG. 8, and the instruction flow 900B can be performed by another computer system.

The computer system 800 can execute a store instruction 910A, an inserted preloading instruction 920A, and a dependent load instruction 930A. The store instruction 910A can store data to a read-write memory, such as the backing memory 830, at the memory address A. In addition, the store instruction 910A can invalidate a corresponding cache entry in the read-only cache unit 820 when the read-only cache unit 820 has a cache hit to the memory address A.

Further, the computer system 800 can execute the preloading instruction 920A. The preloading instruction 920A can be proactively inserted by hardware of the computer system 800. For example, the computer system 800 can include circuits that can detect the store instruction 910A in the pipeline, and can generate and insert the preloading instruction 920A in the pipeline after the store instruction 910A. In an example, the computer system 800 can stall the pipeline before the dependent load instruction 930A, and insert the preloading instruction 920A. In another example, the computer system 800 can detect an opening in the pipeline before the dependent load instruction 930A, and insert the preloading instruction 920A in the opening.

The preloading instruction 920A can be inserted in suitable stages in the pipeline, such as a cache access stage. The preloading instruction can mimic a load instruction at the cache access stage, for example, to access the memory address A and load the data at the memory address A. Due to the reason that the cache entry that includes the data at the memory address A is invalidated by execution of the store instruction 910A, the preloading instruction 920A can cause a cache miss. Then, the execution of the preloading instruction 920A can start a cache line-fill that can fill the cache entry of the read-only cache unit 820 with data from the backing memory 830. The cache entry then includes the updated data at the memory address A. In addition, the execution of the preloading instruction 920A can re-validate the cache entry.

Further, when the computer system 800 executes the dependent load instruction 930A, the read-only cache unit 820 can have a cache hit, and the data at the memory address can be loaded from the read-only cache unit 820.

In FIG. 9B, the other computer system can execute the store instruction 910B and the dependent load instruction 930B without a preloading instruction. The execution of the store instruction 910E can store data in, for example, the backing memory 830 at the memory address A. Further, the execution of the store instruction 91013 can invalidate a corresponding cache entry in read-only cache unit 820.

When the other computer system executes the dependent load instruction 930B, the other computer system has a cache miss, and has to load the data from the backing memory 830. Thus, the other computer system takes a longer time to load the data.

Figure 10:
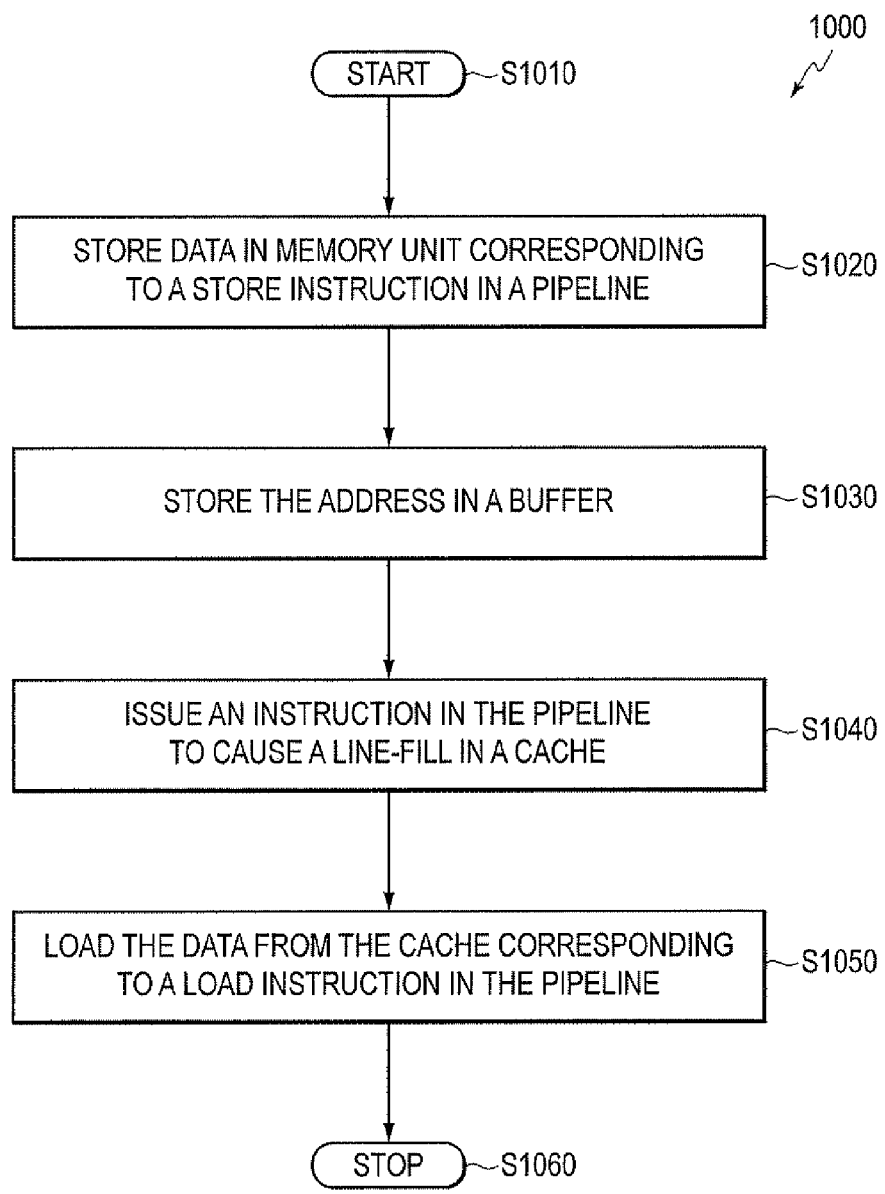
FIG. 10 shows a flowchart outlining an exemplary process for improving cache efficiency.

FIG. 10 shows a flowchart 1000 outlining an exemplary process for improving read-only cache efficiency. The process can be executed by the computer system 800 in FIG. 8. The process starts at step S1010, and proceeds to step S1020.

In step S1020, the computer system 800 can execute a store instruction that stores data in a memory address. The data can be stored in a read/write memory, such as the backing memory unit 830. The computer system 800 can include a read-only cache, such as the read-only cache unit 820, that can be accessed at a faster speed than the backing memory 830. However, the data can not be written directly to the read-only cache unit 820. Thus, the read-only cache unit 820 can include a stale copy for the memory address. The computer system 800 can invalidate a cache entry of the read-only cache unit 820, corresponding to the memory address. Then, the process proceeds to step S1030.

In step S1030, the computer system 800 can store the memory address, for example, in a specific buffer. Then, the process proceeds to step S1040.

In step S1040, the computer system 800 can proactively insert an instruction in the pipeline to cause a cache-line fill in the read-only cache unit 820. More specifically, the computer system 800 can insert the instruction at, for example, a cache access stage in the pipeline, to mimic a load instruction at the cache access stage. The inserted instruction can use the stored memory address in the specific buffer. The instruction can cause a cache miss at the read-only cache unit 820 and start a mechanism to pull data from the backing memory 830 to the cache entry of the read-only cache unit 820 that corresponds to the memory address. In addition, the cache entry can be re-validated. Then, the process proceeds to step S1050.

In step S1050, the computer system 800 can load the data from the read-only cache unit 820 in response to a dependent load instruction. More specifically, the dependent load instruction can retrieve data corresponding to the memory address. The computer system 800 can check the read-only cache unit 820. The read-only cache unit 820 can have a cache hit, and thus data can be loaded from the read-only cache unit 820 in a reduced time. Then, the process proceeds to step S1060, and terminates.

Figure 11:
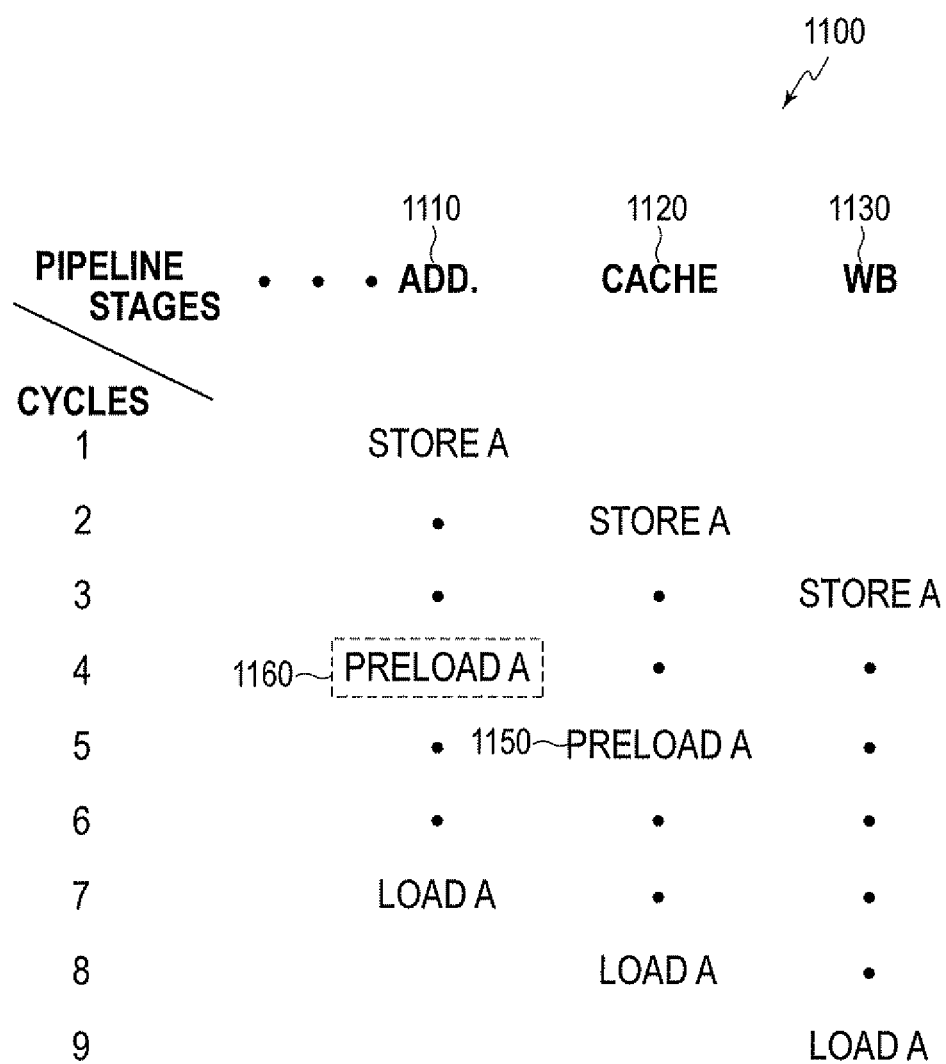
FIG. 11 shows a plot of exemplary pipeline executions according to an embodiment of disclosure.

FIG. 11 shows a plot 1100 of exemplary pipeline executions according to an embodiment of disclosure. The pipeline can include various stages, such as an address generation stage 1110, a cache access stage 1120, and a write back stage 1130.

The pipeline can execute a store instruction that stores data to a memory address A, as shown by cycles 1-3 in FIG. 11. The pipeline then executes a preloading instruction that mimic a loading instruction at specific stages. In an example, the preloading instruction can be inserted in the cache access stage 1120, as shown by 1150, for example, when the address A is a physical address. In another example, the preloading instruction can be inserted in the address generation stage, as shown by 1160, for example, when the address A is a virtual address. Then, the pipeline can execute a dependent load instruction that loads the data at the memory address A.

While the invention has been described in conjunction with the specific exemplary embodiments thereof, it is evident that many alternatives, modifications, and variations can be made to the embodiments described above. Accordingly, exemplary embodiments of the invention as set forth herein are intended to be illustrative, not limiting. There are changes that may be made without departing from the scope of the invention.

What is claimed is:

1. A method for improving cache efficiency, the method comprising:
    storing data in a buffer entry in response to a first store instruction that hits a cache array before the first store instruction is committed, the buffer entry being in association with the cache array;
    speculatively bypassing the data from the buffer entry in response to a first dependent load instruction, the first dependent load instruction being subsequent to the first store instruction, wherein speculatively bypassing the data from the buffer entry in response to the first dependent load instruction retrieves the data from the buffer entry without checking the cache array;
    coalescing data of a second store instruction that overlaps an address of the first store instruction in the buffer entry before the second store instruction is committed;
    evicting the buffer entry to store the data in the cache array if the second store instruction is committed after the first store instruction is committed; and
    clearing the buffer entry if the first store instruction is committed and the second store instruction is aborted.

2. The method of claim 1, further comprising:
    providing the coalesced data from the buffer entry in response to a second dependent load instruction.

3. The method of claim 2, further comprising:
    marking the buffer entry according to a commitment status of at least one of the first store instruction and the second store instruction.

4. The method of claim 3, further comprising at least one of:
    evicting the buffer entry to store the data in the cache array based on the marking; and
    clearing the buffer entry based on the marking.

5. The method of claim 2, further comprising:
    proceeding the first store instruction in a backing memory when the first store instruction is committed; and
    loading from the backing memory in response to the second dependent load instruction when the second store instruction is resolved as non-committed.

6. The method of claim 1, wherein when the first store instruction is committed, the first store instruction is granted by a reorder buffer unit, and the first store instruction is used to update registers.

7. The method of claim 1, further comprising:
    marking the buffer entry according to a commitment status of the first store instruction.

8. The method of claim 7, further comprising:
    evicting the buffer entry to store the data in the cache array based on the marking; and
    clearing the buffer entry based upon the marking.

9. A cache memory, comprising:
    a cache array;
    a buffer unit having a buffer entry, the buffer entry being in association with the cache array; and
    a control unit configured to
        store data in the buffer entry in response to a first store instruction that hits the cache array before the first store instruction is committed,
        speculatively bypass the data from the buffer entry in response to a first dependent load instruction, the first dependent load instruction being subsequent to the first store instruction, wherein speculatively bypassing the data from the buffer entry in response to the first dependent load instruction retrieves the data from the buffer entry without checking the cache array,
        coalesce data of a second store instruction that overlaps an address of the first store instruction in the buffer entry before the second store instruction is committed,
        evict the buffer entry to store the data in the cache array if the second store instruction is committed after the first store instruction is committed, and
        clear the buffer entry if the first store instruction is committed and the second store instruction is aborted.

10. The cache memory of claim 9, wherein the control unit is further configured to:
    provide the coalesced data from the buffer entry in response to a second dependent load instruction.

11. The cache memory of claim 10, wherein the buffer entry comprises at least a field for storing a commitment status of at least one of the first store instruction and the second store instruction.

12. The cache memory of claim 11, wherein the control unit is further configured to:
    evict the buffer entry to store the data in the cache array based on the commitment status; and
    clear the buffer entry based on the commitment status.

13. The cache memory of claim 9, wherein:
    the cache array further comprises a multiple-valid-bit entry, the multiple-valid-bit entry including multiple portions having respective valid bits; and
    the buffer unit further comprises multiple entries that are respectively in association with the multiple portions.

14. The cache memory of claim 9, wherein the cache array is configured as a read-only cache array.

15. A computer system, comprising:
    a processor core configured to access a cache system in response to instructions; and
    the cache system having a backing memory and a cache unit, wherein the backing memory is configured to store data in response to store instructions that are committed, and the cache unit further comprises:
a cache array;
a buffer unit having at least a buffer entry in association with the cache array; and
a control unit configured to
   store data in the buffer entry in response to a first store instruction that hits the cache array before the first store instruction is committed,
   speculatively bypass the data from the buffer entry in response to a first dependent load instruction, the first dependent load instruction being subsequent to the first store instructions, wherein speculatively bypassing the data from the buffer entry in response to the first dependent load instruction retrieves the data from the buffer entry without checking the cache array,
   coalesce data of a second store instruction that overlaps an address of the first store instruction in the buffer entry before the second store instruction is committed,
   evict the buffer entry to store the data in the cache array if the second store instruction is committed after the first store instruction is committed, and
   clear the buffer entry if the first store instruction is committed and the second store instruction is aborted.

16. The computer system of claim 15, wherein the control unit is further configured to:
   provide the coalesced data from the buffer entry in response to a second dependent load instruction.

17. The computer system of claim 16, wherein the buffer entry comprises a field for storing a commitment status of at least one of the first store instruction and the second store instruction.

18. The computer system of claim 17, wherein the control unit further configured to:
   evict the buffer entry to store the data in the cache array based on the commitment status; and
   clearing the buffer entry based upon the commitment status.

19. The computer system of claim 16, wherein the cache system provides data from the backing memory in response to the second load instruction when the second store instruction is resolved as non-committed.

20. The computer system of claim 15, wherein:
   the cache array further comprises a multiple-valid-bit cache line, the multiple-valid-bit cache line including multiple portions having respective valid bits; and
   the buffer unit further comprises multiple entries that are respectively in association with the multiple portions.

\* \* \* \* \*